United States Patent Office 3,652,747
Patented Mar. 28, 1972

3,652,747
PROCESS FOR MANUFACTURING
SYNTHETIC LEATHER
Hiroharu Shirota, Osaka, Kunio Yonemoto, Ikeda, Tuyoshi Masuda, Kobe, Takayuki Ito, Amagasaki, and Ryuzo Nagaki, Izumi-Otsu, Japan, assignors to Dainippon Ink and Chemicals, Incorporated, Tokyo, Japan
No Drawing. Filed Mar. 9, 1970, Ser. No. 17,909
Claims priority, application Japan, Mar. 17, 1969,
44/19,551; Apr. 7, 1969, 44/26,173
Int. Cl. B29d 27/04
U.S. Cl. 264—41    13 Claims

ABSTRACT OF THE DISCLOSURE

A process for manufacturing a synthetic leather made up of a base cloth, a sponge layer (at times also a skin layer) and a surface treating agent layer, in which the sponge layer is formed by using an aqueous dispersion containing gas bubbles which has been obtained by mixing a polyurethane resin.

---

This invention relates to a a process for manufacturing a synthetic leather which has been made by coating the surface of a base cloth with a synthetic high molecular weight compound. More particularly, the invention relates to a process for manufacturing a synthetic leather which has been made by forming on the surface of a base cloth a layer of polyurethane resin film having a polyurethane dispersion-derived foam structure, followed by application thereon of a surface treating agent selected from the group consisting of polyamide resins, polyurethane resins and polyacrylic resins, with or without interposing between the polyurethane resin film layer and surface treating agent layer of a polyurethane resin film layer made from a polyurethane dispersion containing little or no gas bubbles.

The present invention further relates to a process for manufacturing a synthetic leather by using a dispersion wherein fluctuations in the agitating speed do not cause any difference in the amount of gas bubbles incorporated and, in addition, the gas bubbles are minute and moreover do not increase in size with the passage of time.

Heretofore, as a synthetic leather having a foam structure in its intermediate layer a leather of polyvinyl chloride plasticized by means of a plasticizer has been known. The procedure of its manufacture is as follows: A plasticizer is mixed in polyvinyl chloride and the mixture is rendered into paste form, after which a substance which decomposes and evolves a gas on heating to a given temperature is added to form a film not containing gas. The film is then heated to a given temperature whereupon gas is evolved and a layer of a resin film having a foam structure is manufactured.

Heretofore, in the incorporation of the bubbles in an aqueous dispersion the method used was that in which the air of the atmosphere was whipped into the aqueous dispersion with a foaming machine or the like and then divided into fine bubbles by agitation or that in which ag as was blown into an aqueous dispersion, after which the gas was divided into fine bubbles by agitation. However, in either case the rate of incorporation of the gas in the aqueous dispersion was not stable, it being affected by the agitation speed. Further, the bubbles being unstable, there was the shortcoming that the bubbles would integrate with the passage of time to result in an increase in the size of the bubbles.

Heretofore, the resin concentration had to be at least 60% by weight for forming a resin layer having a foam structure from a dispersion. When the resin concentration exceeds 60% by weight, the dispersion containing air bubbles as a result of air having been whipped in by vigorous agitation of the dispersion, upon application and drying forms a resin film layer having a foam structure without practically any of the dispersed particles migrating to the surface of the film. However, when the resin concentration does not exceed 50% by weight there is the shortcoming that, the dispersed particles migrate to the film surface in concomitance with the evaporation of the moisture even though the resin film is made in the same manner, thereby causing the formation of hollow layers in the film or the air bubbles to become large and nonuniform.

An object of the present invention is to provide a process for the manufacture of a new synthetic leather to take the place of the polyvinyl sponge leather in which a plasticizer has been used causing blocking as a resulting of migration or results in the production of a product whose hand exhibits great change depending upon temperature. Another object is to provide a process for manufacturing a synthetic leather having a foam structure which is a result of having used an aqueous dispersion blend containing minute gas bubbles and of an apparent specific gravity not more than 0.7, which has been obtained by mixing in an aqueous dispersion a substantially linear thermoplastic polyurethane resin of a resin concentration of at least 25% by weight, a dispersion particle size of below 5 microns, the dried film of which has a tensile strength of at least 100 kg./cm.$^2$, an elongation of at least 200% and tenacity at 100% elongation of 5–50 kg./cm.$^2$, 10–100% by weight, based on the polyurethane resin contained in said aqueous dispersion, of a hygroscopic porous material of smaller than 30 mesh, preferably smaller than 50 mesh. A still another object of this invention is to provide a process for manufacturing a synthetic leather which is especially suitable for such uses as upholstering of seats of vehicles and chairs as well as binding of books.

In the case of the bubble-containing aqueous dispersions obtained by mixing a hygroscopic porous material in the aqueous dispersions according to the invention, no difference in the amount of gas incorporated occurs even though the agitating speed fluctuates. Moreover, the gas bubbles which have been incorporated in the aqueous dispersion are minute and do not increase in size by integration with the passage of time. When the hygroscopic porous material is mixed in the aqueous dispersions according to the invention, the moisture becomes adsorbed into the hygroscopic porous material to cause the gas which had been occupying the pores of the hygroscopic porous material to be discharged into the aqueous dispersion to become present therein as minute gas bubbles. Hence, the agitation of the aqueous dispersion may be carried out at a speed which is only necessary for mixing the hygroscopic porous material. Thus, another feature of the invention is that there is no need for any special mixer for incorporating the gas into the aqueous dispersion.

Further, while the reasons are not clear, it was found that the bubbles obtained by mixing in the hygroscopic porous material according to the invention process not only did not tend to integrate and become large with the passage of time as in the case with the bubbles incorporated mechanically by means of a foaming machine or the like but also had the characteristic of not being easily defoamed. That the aqueous dispersion is not easily defoamed means that there is the characteristic not only that the bubbles do not readily migrate to the dried surface of a sponge sheet when it is being manufactured by drying the aqueous dispersion containing the gas bubbles but also that the rate in which the gas is incorporated in the aqueous dispersion directly equals the density of the sponge sheet.

The term "hygroscopic porous material," as herein used, is one which is characterized by its surface and/or interior porosity and affinity for water, and includes the case where the moisture is not only merely physically adsorbed to the surface but also the case of occlusion of the moisture as water of crystallization. Included are the condensation acid anhydrides and condensation acid salts obtained from silicic acid, aluminic acid and aluminosilicic acid. These compounds, which have the form of a three-dimensional framework of a single or a plurality of classes of polyhedrons having common vertexes, form a void in the middle of the polyhedrons with the polymembered rings connecting the vertexes of the polyhedrons as windows. As the hygroscopic porous material which are characterized by the possession of such a structure, silica gel, alumina gel, zeolite, and the homologues thereof can be mentioned as being typical. The preferred pore diameter of the hygroscopic porous material ranges from several to several hundred angstroms, and the surface area is 100 to 1500 m.²/g. while the pore volume is from 0.1 to 0.8 ml./g. The size of the hygroscopic porous material suitable for use in the present invention is not imposed with any particular restriction. However, if the size is too large, either unevenness of the coating occurs when applying the resulting aqueous dispersion containing the minute gas bubbles or unevenness occurs in the surface of the sponge sheet which is obtained on drying. According a powdered material of not greater than 30 mesh, preferably not greater than 50 mesh is preferred. Further, it is also possible to use as the hygroscopic porous material in the present invention the homopolymers or copolymers of the monoethylenic monomers such as vinyl chloride, vinyl acetate and acrylic esters, provided they are in the form of a fine powder whose particles size falls within the foregoing range. The hygroscopic porous material is added in an amount of 10 to 100% by weight based on the dispersoid of the aqueous dispersion, and it is preferred that the sum total of the volumes of the dispersoid and the hygroscopic porous material to be added is within 2–3 times the difference between the volume of the dispersion medium and the pore volume of the hygroscopic porous material. When the amount of the hygroscopic porous material added is too great, the system's function as an aqueous dispersion is destroyed.

The invention process is carried out in the following manner. A solution of a surface treating agent selected from the group consisting of the polyamide, polyurethane and polyacrylic resins is applied to the surface of a releasing material in an amount such that the dried resin film obtained is 0.002–0.2 mm. in thickness and dried, followed by heat treatment, if necessary. Atop this is applied a minute bubble-containing aqeous polyurethane dispersion having an apparent specific gravity not greater than 0.7 in an amount such that the thickness of the layer of the polyurethane resin film obtained is 0.2–1 mm. upon drying, after which a base cloth is superposed in the undried or semi-dried state of the foregoing applied dispersion, followed by pressing the base on the dispersion-coated surface and drying. If necessary, a heat treatment is also carried out on the foregoing assembly for a period not exceeding 10 minutes at not higher than 160° C. for effecting the complete fusion of the polyurethane particles. After the assembly has cooled, either the releasing material is strippd or the foregoing dispersion blend containing the gas bubbles is again applied and dried, followed by adhering a base cloth with an adheseive and thereafter repeating the foregoing treatment. In either cas, wrinkles simulating those of natural leather are imparted either by crumpling by hand or by means of embossing rolls after stripping of the releasing material. Another effective way of imparting the wrinkles is accomplished by embossing the releasing material with wrinkles in advance of its use. In the above described process, after application and drying of the solution of a surface treating agent, an aqueous dispersion containing no fillers at all or one containing fillers in a amount ranging up to 200% by weight based on the resin content therein may be applied as a skin layer in an amount such that the dried film formed become a thickness of not more than 0.5 mm., and preferably 0.05–5 mm., and dried, followed by the application of the foregoing bubble-containing dispersion blend. In addition to the hereinabove described procedure wherein either the surface treating agent layer alone or both the surface treating agent and skin layers are applied to the releasing material in the beginning, it is also possible to defer the application of these layers to the last. That is to say, the sponge sheet layer can be formed on the releasing material with or without application of the skin layer, followed by adhering the base cloth and stripping of the releasable material, after which the surface treating agent layer is applied. In this case, if the skin layer has not been previously formed, the skin layer can be applied and formed prior to the application of the surface treating agent layer.

The aqueous dispersions according to the invention, upon drying and, if necessary, by being heat treated for a period not exceeding 10 minutes at a temperature not exceeding 160° C. for fusing the particles of the dispersed form a dried urethane resin film having a tensile strength of at least 100 kg./cm.², an elongation of at least 200% and a tenacity at 100% elongation of 5–50 kg./cm.². If any one of these conditions are not satisfied, the synthetic leather manufactured would be inferior in its strength and other properties as to be of no practical use.

The aqueous dispersions according to the invention are obtained either by emulsifying and dispersing in water a polyurethane resin or its solution, which has been obtained from at least one of either the hydroxyl-terminated polyethers, polyesters or polyether esters of a molecular weight 600–4000, a diisocyanate, and a chain extender, or by emulsifying and dispersing a prepolymer having terminal hydroxyl groups or its solution, which has been obtained by reacting the foregoing hydroxyl-containing compound with a diisocyanate in a mole ratio of 1:1.2–1:2.5, followed by extending the chain by means of the foregoing chain extender. It goes without saying that not only is it possible to use only a single class of each of the components of the hydroxyl-containing compound, diisocyanate and chain extender, but it is also possible to use two or more of each. The hydroxyl-containing compounds of a molecular weight of 600–4000, and preferably 600–3000, as is apparent to those skilled in the polyurethane art, include as typical examples the polyethylene ether, glycols, poly-1,2-propylene ether glycols and polytetramethylene ether glycols of the formula

$$H(OR)_nOH$$

wherein R is alkylene and $n$ is an integer of about 5–300, polyether glycols such as polyethylene ether polypropylene ether glycols of the formula

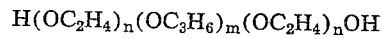

$$H(OC_2H_4)_n(OC_3H_6)_m(OC_2H_4)_nOH$$

wherein $n$ is an integer of about 1–150 and $(m+2n)$ is an integer of about 5–300, and polyesters having terminal hydroxy groups of the formula

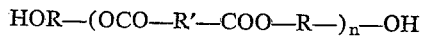

$$HOR-(OCO-R'-COO-R-)_n-OH$$

wherein R is a glycol residue, R' is a dibasic acid residue and $n$ is an integer of about 2–50. The typical glycol component used in the preparation of polyesters include ethylene glycol, diethylene glycol, triethylene glycol, trimethylene glycol, 1,2-propylene glycol, tetramethylene glycol, 1,3-butylene glycol, 1,4-butylene glycol, 1,3-propylene glycol, pentamethylene glycol, 2,2-dimethyltrimethylene glycol, hexamethylene glycol and decamethylene glycol. On the other hand, as the dibasic acids, malonic acid, maleic acid, succinic acid, adipic acid, pimelic acid, sebacic acid, oxalic acid, phthalic acid, hexahydrophthalic acid and para-phenylene diacetic acid are representative. Further, poly-epsilon-caprolactone or poly-epsilon methylcaprolactone obtained by the ring-opening polymerization of epsilon-caprolactone or epsilon-methylcaprolactone, or the ring-opened polymer of epichlorohydrin may likewise be used as the compound having at least two hydroxyl groups at their ends. The compound having at least two terminal hydroxyl groups should preferably be one whose molecular weight is 300–4000. As the organic diisocyanates the aliphatic, alicyclic and aromatic diisocyanates or the mixtures thereof can be used. As typical diisocyanates, mention can be made of 2,4-tolylenediisocyanate,
2,6-tolylenediisocyanate,
4,4'-methylene bis-phenylisocyanate,
m-phenylenediisocyanate,
3,3'-dimethyl-4,4'-biphenylenediisocyanate,
4,4'-diphenylenediisocyanate,
4-chloro-1,3-phenylenediisocyanate,
3,3'-dichloro-4,4'-biphenylenediisocyanate,
1,5-naphthalenediisocyanate,
ethylenediisocyanate,
ethylidenediisocyanate,
propylene-1,2-diisocyanate,
butylene-1,3-diisocyanate,
tetramethylenediisocyanate,
hexamethylenediisocyanate,
1,2-cyclohexylenediisocyanate,
1,4-cyclohexylenediisocyanate and
4,4'-methylenebiscyclohexylisocyanate.

The chain extender is a compound having at least two active hydrogen atoms which are capable of reacting with the isocyanate groups. Useable typically are the glycols, alkanolamines and diamines such, for example, as ethylene glycol, tetramethylene glycol, hexamethylene glycol, diethylene glycol, monoethanolamine, ethylenediamine, triethylenediamine, 1,2-propylenediamine, hexamethylenediamine, N-ethanolethylenediamine, N,N'-diethanolethylenediamine, m-phenylenediamine, 2,4-tolylenediamine, bis-4-aminophenylmethane, 3,3'-dichloro - 4,4' - diaminodiphenylmethane, piperazine and 2-methylpiperazine. Also useable however are the reaction product of one mole of alkylenediamine and 2 moles of acrylamide and the reaction product of one mole of alkylenediamine and 2 moles of acrylonitrile. The foregoing materials which have been enumerated hereinbefore as being used in the production of polyurethane are all well-known in the polyurethane art. In emulsifing the adduct of the organic diisocyanate and a compound having at least two terminal hydroxyl groups, the adduct can also be used in the form of an organic solvent solution. The organic solvent to be used in this case includes typically the aliphatic hydrocarbons such as n-hexane, n-octane, 2-ethylhexane and n-decane, the aromatic hydrocarbons such as benzene, toluene and xylene, and the halogenated hydrocarbons such as methylene chloride, ethylene dichloride, trichloroethylene and perchloroethylene. The solvent is preferably used in an amount equal to or less than the weight of the adduct. The concentration of the aqueous polyurethane dispersion suitably used in the present invention is about 20–60% by weight. The aqueous dispersion of polyurethane resin according to the present invention may be incorporated with stabilizers, colorants, fillers and thickeners, if desired. As the stabilizer, in addition to those for stabilizing the polyurethane resin against oxidation, heat and light, additives for improving the mechanical and chemical stability of the dispersion and stabilizers for stabilizing the foam are used. As stabilizers for the polyurethane resin, included are, for example, the antioxidants such as the substituted phenols as alkylphenols, alkylated phenol ethers and alkylated phenol esters, alkylene or alkylidene-bisphenol, polyalkylated phenols, thiobisalkylated phenols, thiopropionic acid esters and organic phosphite esters; the ultraviolet absorbents as salicylates, benzoates, benzopnenone and benzotriazole; the antistatic agents such as the nitrogen-containing compounds as long chain aliphatic amines, long chain aliphatic amides and quaternary ammonium salts, sulfonic acid esters as allylalkylsulfonic acid esters, phosphoric acid esters as allylalkyl phosphoric acid esters, phophoric acid ester amides, polyglycol derivatives as aliphatic polyglycol esters and polyglycol allylalkyl ethers, and polyethylene glycol; the flame retardants such as antimony oxide, the halides as diphenyl trichloride, diphenyl tetrachloride, 1,2-dibromo-1,1,2,2 - tetrachloroethane, 1,2,3-tribromopropane, tetrabromobisphenol and chlorinated paraffin, phosphorus-containing compounds as dimethyl phosphite and trimethyl phosphite, halogen and phosphorous-containing compounds as tris-(2-chloroethyl) phosphite, tris-(2-bromoethyl) phosphate and tris-(2,3-dibromopropyl) phosphate; and the antifungal agents such as the organic copper compounds as copper naphthenate, organic tin compounds as bis (tributyl tin) oxide, organic mercury compounds as phenylmercuric acetate and phenylmercuric oleate, and phenolic derivatives such as pentachlorophenol and sodium phentachlorophenol.

As additives for improving the mechanical and chemical stabilities of the dispersion, mention can be made of such, for example, as the nonionic surfactants as polyoxyethylenealkyl ethers or polyoxyethylenealkyl allyl ethers whose number of moles added of ethylene oxide is from 20 to 100; the anionic surfactants as fatty acid salts, salts of higher alcohol sulfates, alkylallyl-sulfonic acid salts and salts of higher alcohol phosphates; dipotassium phosphate, disodium phosphate, disodium ethylenediamine tetraacetate, soidum nitrotriacetate, cyclohexadiamine-tetraacetic acid.

As stabilizers for the stabilization of the foam, included are such, for example, as saponin, salts of higher alcohol sulfates, salts of higher alcohol phosphates, alkylallyl-sulfonic acid salts, and polyoxyethylenealkylamides whose number of moles added of ethylene oxide is 2 to 20. As colorants the pigments are usually used. Both the inorganic and organic pigments may be used. As inorganic pigments, included are such, for example, as cadmium red, red oxide, cadmium orange, chrome orange, cadmium yellow, chrome oxide green, ultramarine, cobalt violet, titanium dioxide and white lead. On the other hand, as organic pigments mention can be made of such, for example, as brilliant carmine 6B, rhodamine lake B, naphtol red, benzidine orange, benzidine yellow, copper phthalocyamine green, phthalocyamine blue, dioxazine violet, carbon black and aniline black. In addition, the metallic powders of copper, aluminum, etc., and the pearl-essence of lead arsenate can also be used. As filters, mention can be made of the chrysotile type asbestos, silicic anhydride, calcium carbonate, kaolin, clay, kaolin type clay, aluminum silicate, magnesium silicate, silica type clay, talc, diatomaceous earth and finely divided mica. The hygroscopic porous material does not exceed 200% by weight of the polyurethane resin contained in the aqueous dispersion.

While the viscosity of the aqueous dispersion according to the present invention is not imposed with any particular restrictions, a viscosity ranging between 1000 and 100,000 centipoises is preferred for manufacturing the sponge sheet by application and drying of the foamed aqueous dispersion. When the viscosity of the bubble-containing aqueous dispersion is lower than that suitable for use, its viscosity is preferably adjusted by adding a thickener. As the thickener those typically used are the natural water-soluble high molecular weight compounds such as starch and protein; the alkali metal salts, amine salts or ammonium salts of such as hydroxyethylcellulose, carboxymethylcellulose or carboxyethylcellulose; the water-soluble cellulosic derivatives such as methyl cellulose and ethyl cellulose; the water-soluble synthetic high molecular weight compounds such as polyvinyl alcohol, polyvinylethyl ether, polyvinylpyrolidone, polyacrylamide and the alkali metal, amine or ammonium salts of polyacrylic or polymethacrylic acid; and an aqueous dispersion of an acrylic and/or methacrylic thickener of the alkali thickening type which uses in combination an aqueous alkali solution of either potassium hydroxide, sodium hydroxide, amine or ammonium hydroxide with an acrylic and/or methacrylic copolymer dispersion of a concentration at or below 35%, which latter copolymer is obtained by copolymerizing at least 50 mol percent of acrylic and/or methacrylic acid, not more than 45 mol percent of an ester of the foregoing acid with an alcohol having an alkyl radical of not more than 4 carbon atoms, and not more than 5 mol percent of a monomer having a polymerizable ethylene group such as divinylbenzene, diallyl phthalate or ethylene glycol dimethacrylate. Two or more of these thickeners can be used as a mixture. Again, these thickeners may be added as such or in the form of an aqueous solution.

The foregoing additives such as stabilizers, colorants, fillers and thickeners, which are added to the aqueous dispersion as required, may either be added to the aqueous dispersion whose foaming has been set up by the addition of the hygroscopic porous material or be added to the aqueous dispersion prior to the addition of the hygroscopic porous material.

In accordance with the present invention, an aqueous dispersion containing stable and minute bubbles can be obtained without differences in the rate of incorporation of the bubbles due to fluctuations of the agitating speed. This will be illustrated by the following experiments.

EXPERIMENT 1

One mole of polypropyleneglycol of a molecular weight of 2000 and 2 moles of tolylenediisocyanate (isomer ratio of 2.4—:2.6— =80:20) were reacted for 2 hours at 80° C. to obtain an adduct having terminal isocyanate groups. 352 parts by weight of toluene were added to 1,174 parts by weight of the foregoing adduct and a homogeneous solution was obtained. To this solution were added about 1,237 parts by weight of an aqueous surfactant solution containing 5.47% by weight of dihydric polyoxyethylene-polyoxypropylene surfactant of a molecular weight of about 16,000 composed of polyoxypropylene of a molecular weight of about 3450 and polyoxyethylene, the latter accounting for about 80% by weight of the surfactant. After the preliminary emulsification of the solution was carried out by the addition of the surfactant, the mixture was passed through a colloid mill to obtain an aqueous dispersion of the adduct. 61 parts by weight of an aqueous solution containing 30 parts by weight of ethylenediamine were added to the foregoing dispersion and stirred gently for about 30 minutes to obtain an aqueous polyurethane resin dispersion having a concentration of 44.8% and a viscosity of 280 centipoises. The viscosity of this aqueous polyurethane resin dispersion was adjusted to 12,000 centipoises by adding to 100 parts by weight thereof 0.2 part by weight of 25% ammonia water and 2 parts by weight of a polymethacrylic copolymer dispersion of 25% concentration obtained by copolymerizing 20% by weight of methyl methacrylate and 80% by weight of methacrylic acid. While agitating 100 parts of the aqueous polyurethane resin dispersion, whose viscosity had been increased, as hereinabove described, at the agitating speeds prescribed below, an addition thereto was made of 15 parts by weight of silica gel powder of a particle size of 100–250 mesh having a surface area of 700 m.²/g., a pore volume of 0.40 ml./g., an apparent specific gravity of 0.71 and an average pore diameter of 23 A., the addition being made over a period of one minute. This was followed by further agitation at the same speed for 4 minutes. The so obtained aqueous polyurethane resin dispersion containing gas bubbles was then dried for 3 minutes at 100° C. to obtain a sponge sheet. The resulting sponge sheet was measured for its specific gravity. As a control, a sample not containing the scilia gel powder was made in the same manner and measured for its specific gravity. These results are given in Table 1, below.

TABLE 1

| Agitating speed (rpm) | Specific gravity | |
|---|---|---|
| | Invention sample | Control sample |
| 0 | | 1.13 |
| 500 | 0.57 | 1.08 |
| 750 | 0.56 | 0.99 |
| 900 | 0.56 | 0.75 |
| 1,100 | 0.56 | 0.58 |
| 1,400 | 0.55 | 0.51 |
| 1,700 | 0.55 | 0.50 |
| 2,500 | 0.53 | 0.48 |
| 3,000 | 0.52 | 0.46 |

Thus, according to the present invention, the content of gas bubbles was great even at low agitating speeds, the change in content of the gas bubbles being small.

EXPERIMENT 2

A polymethacrylic copolymer dispersion identical to that used in Experiment 1 and 10% by weight thereof of 25% ammonia water were added to the aqueous polyurethane resin dispersions of concentration 44.8% and viscosity 280 centipoises, such as used in Experiment 1, to obtain aqueous polyurethane dispersions of the below indicated prescribed viscosities. While agitating 100 parts by weight of each of these aqueous polyurethane resin dispersions at 1500 r.p.m., 15 parts by weight of the same silica gel powder used in Experiment 1 were added over a period of one minute, followed by further agitation for 4 minutes. The aqueous polyurethane resin dispersions were then made into sponge sheets by the procedure of Experiment 1 and measured for their specific gravity. As a control, a similar experiment was conducted with the aqueous polyurethane resin dispersion not containing the silica gel powder. The results obtained are shown in Table 2.

TABLE 2

| Viscosity (cps.) | Specific gravity | |
|---|---|---|
| | Invention sample | Control sample |
| 1,000 | 0.55 | 0.61 |
| 2,500 | 0.55 | 0.57 |
| 5,000 | 0.55 | 0.53 |
| 10,000 | 0.55 | 0.50 |
| 14,000 | 0.54 | 0.56 |
| 17,000 | 0.55 | 0.65 |
| 20,000 | 0.54 | 0.81 |
| 40,000 | 0.55 | |

Thus, it can be seen that according to the present invention sponge sheets whose content of the gas bubbles show hardly any variation can be obtained regardless of whether the viscosity is high or low.

The aqueous polyurethane dispersions used in the present invention must have a resin concentration of at least 25% by weight. This concentration should preferably be from 25% to 60% by weight, and still more preferably should range from 25% to 50% by weight. Further, the particle diameter of the dispersoid must not exceed 5 microns. If the resin concentration is lower than 25% by weight, it is difficult to obtain a dispersion blend containing gas bubbles of saisfactory size even though the hygroscopic porous material is mixed therein. Moreover, a sponge layer having a good foam structure cannot be obtained no matter what the drying temperature is. On the other hand, when the particle diameter exceeds 5 microns, there is the defect that the fusion of the particles during drying does not take place readily and cracks appear in the film. The aqueous dispersion of the invention are those in which the polyurethane resin, the dispersoid, had been emulsified and dispersed by means of 5–20% by weight, based on the dispersoid, of a nonionic or anionic surfactant or a mixture of these. As nonionic surfactants, preferred are polyoxyethylenealkylallyl ether, polyoxyethylenealkyl ether or polyethylene glycolpolypropylene glycol block copolymers. As anionic surfactants, preferred are the alkali metal, ammonium or alkylamine salts of either the higher fatty acids, alkylallylsulfonic acids or alkyl sulfuric esters.

The production of a film layer of polyurethane resin having a foam structure from an aqueous polyurethane dispersion of a resin concentration of at least 25% by weight is made possible for the first time by the addition therein of 10–100% by weight, based on the resin contained in the dispersion, of a hygroscopic porous material-incorporated dispersion and agitation of the porous material-incorporated dispersion. When a polyurethane dispersion whose resin concentration falls short of 25% by weight is used, while it may be possible to obtain a polyurethane dispersion containing gas bubbles, the size of the bubbles are large and gas cells in the resin film layer resulting from these bubbles are about 1–2 mm. in size and are moreover non-uniform, with the consequence that the resulting polyurethane resin film is unsatisfactory in its elastic recovery, a property in which this resin should intrinsically be superior.

According to the present invention, to the aqueous polyurethane dispersion whose resin concentration is at least 25% by weight, 10–100% by weight, based on the resin contained in the dispersion, of a hygroscopic porous material is added with stirring to obtain an aqueous polyurethane dispersion containing gas bubbles, followed by drying this dispersion to obtain a polyurethane resin film having a uniform and minute foam structure whose gas cells are of less than about 1 mm. in size. While the drying temperature may be raised to as high as 130° C., usually a temperature ranging from 60° to 120° C., and preferably 80° to 110° C., is used. The size of the hygroscopic porous material must be in a range as to make possible the application of the hygroscopic porous material-containing aqueous polyurethane dispersion to a substructure. Usually, the size must be smaller than 30 mesh. When this hygroscopic porous material is added with stirring to an aqueous polyurethane dispersion whose resin concentration is at least 25% by weight in an amount of 10–100% by weight, based on the resin content of the dispersion, it is believed that water, the dispersion medium, is adsorbed by the hygroscopic porous material and, in place of the water, the gas contained in the minute pores of the hygroscopic porous material is discharged therefrom to become minute gas bubbles which remain in the polyurethane dispersion and, at the same time, that as a result of the adsorption by the hygroscopic porous material of water, the dispersion medium, the apparent amount of the dispersion medium decreases, with the consequence that the resin concentration is increased to effectively operate in stabilizing the gas bubbles. If the hygroscopic porous material is concentratively added locally to the polyurethane dispersion, there is a danger of local aggregation of the dispersion taking place as a result of the excessive amount of water being absorbed in that particular part. Accordingly, the addition of the hygroscopic porous material is preferably made in small increments while stirring the polyurethane dispersion at a speed of 500–5000 r.p.m. At this time, the air at the surface of the polyurethane dispersion becomes whipped into the dispersion to raise its content of bubbles. It is only when the apparent specific gravity of the polyurethane dispersion containing the gas bubbles is a value of below 0.7 that a film of polyurethane resin having a good foam structure can be obtained.

As the releasing material to be used in carrying out this invention, useable are either those films having releasing properties such as the films of polyethylene, polypropylene and polyester or sheets coated with a substance having releasing properties, such as silicone paper. In most cases, it is preferred that these are embossed. As the base cloth, useable are either the knit or woven fabrics or nonwoven fabrics. The knit or woven fabrics include those of natural fibers such as cotton, wool and hard and bast fibers, those of artificial fibers such as cellulose acetate, and those of man-made fibers such as polyamide, vinylon, polyester, acrylonitrile and polypropylene. The nonwoven fabric is a textile product obtained not by weaving but by the web of the foregoing fibers being bonded by means of a binder such as a dispersion of acrylic esters, natural or synthetic rubber, or polyurethane resins. A surface treating agent is effective for improving the hand of the polyurethane resin film. The classes of resins which are preferably used as a surface treating agent include the polyurethane, polyamino polyacrylic ester and polyamide resins, which are used in the form of an organic solvent solution.

As the polyurethane resin, a polyurethane resin identical to that used for the skin layer can be used. Particularly preferred are those whose dried film has a tenacity at 100% elongation of above 70 kg./cm.$^2$, a tensile strength of above 200 kg./cm.$^2$ and an elongation of above 150%. As the polyamino acid resins, the polymers obtained from the series of alpha-amino acids, i.e. neutral amino acids, acidic amino acids and their omega-monoesters, basic amino acids and their derivatives are used. For example, useable are one or more classes of the homopolymers and copolymers obtained by homopolymerizing or copolymerizing the neutral amino acids such as glycine, alanine, phenylalanine, laucine, isoleucine and valine; the acidic amino acids such as glutamic acid; the basic amino acids such as ornithine, lysine and arginine; and, in addition, cystine and methionine. The most preferred is, however, poly (gamma-methylglutamate).

As solvents, useable are methylene dichloride, chloroform, ethylene dichloride, dimethyl sulfoxide, diethyl sulfoxide, nitromethane, m-cresol, dimethylformamide, diethylformamide and dimethylacetamide. In addition, acetone, methyl ethyl ketone, carbon tetrachloride, acetonitrile, propionitrile, methane, ethanol, dioxane and tetrahydrofuran can be used mixed with the foregoing solvents. As the polyacrylic resins, useable in addition to poly(methyl methacrylate) are the copolymers of above 70% by weight of methyl methacrylate with below 30% by weight of methacrylic alkyl esters and/or acrylic alkyl esters (in both cases the number of carbon atoms of the alkyl radical is not more than 4). Further, it is also possible to use as the surface treating agent a mixture of above 50% by weight of these polymers or copolymers and below 50% by weight of a vinyl chloride copolymer containing above 80% by weight of vinyl chloride. As monomers to be used for manufacturing the foregoing vinyl chloride copolymers, ethylene and vinyl acetate are convenient. As solvents of the polyacrylic resin, useable are acetone, ethyl acetate, butyl acetate, tetrahydrofuran, benzene, toluene, xylene, methyl ethyl ketone, methyl isobutyl ketone, dioxane, dimethylformamide, diethylformamide and dimethylacetamide. As the polyamide resins, useable are the polyamides obtained from the diamines such as ethylenediamine, triethylenediamine, 1,2-propylenediamine, hexamethylenediamine, diaminobenzene, toluenediamine and xylenediamine and the dibasic acids such as malonic acid, maleic acid, succinic acid, adipic acid, pimelic acid, sebacic acid, oxalic acid, phthalic acid, hexahydroterephthalic acid and paraphenylenediacetic acid, and the polyamides obtained by the ring-opening polymerization of caprolactam, as well as the derivatives of these polyamides, which may be used either singly or in combinations. A particularly desirable polyamide is the N-methoxymethylated polycaprolactam. As solvents, useable are methanol, ethanol, isopropanol, cresol and ethylene dichloride. In addition, water, chloroform, toluene and xylene can be used mixed with the foregoing solvents. The surface treating agent is applied with either a knife coater or roll coater in the form of a 5–30 weight percent solution and is heat treated after drying, if necessary. When an aqueous polyurethane dispersion containing little or no gas bubbles is applied after application and drying of the surface treating agent solution, this polyurethane dispersion, which forms the skin layer of the synthetic leather of the invention, is applied for further enhancement of the smoothness of the surface of the synthetic leather and strength of the foam layer. Accordingly, when the smoothness of the synthetic leather surface and strength of the form layer are fully satisfactory for the use for which the product is intended, the formation of this skin layer is not particularly necessary. As previously noted, pigments, fillers and other additives may be added to the polyurethane dispersion to be used for forming the skin layer. In adding the additives, the amount in which these are added must not exceed 200% by weight. When there is danger of bubbles being incorporated in this dispersion during its mixing, the addition of a silicon type antifoaming agent in an amount not exceeding 0.1% based on the dispersion will do. The aqueous polyurethane dispersion for forming the skin layer is applied with either the conventional knife coater or roll coater in an amount such that the dried resin film obtained is not more than 0.5 mm. thick. After application, the film is dried at 80–120° C., and preferably 95–110° C. Atop the surface treating agent film, to which has or has not been applied a skin layer, is then applied an aqueous polyurethane dispersion containing gas bubbles. When the amount of dispersion applied is so great as to make its drying difficult or when undesirable bubbles form during drying, the application and drying is divided and carried out in several operations. After application of the bubble-containing aqueous polyurethane dispersion one of the following two methods can be used in adhering the base cloth. After application of the dispersion and while it is still an undried or semi-dried state the base cloth is superposed thereon and adhered by pressing and thereafter dried at a temperature of 60–130° C., and preferably 60–120° C., a still more preferable temperature being 80–110° C. This is followed, if necessary, by a heat treatment step for a period not exceeding 10 minutes at a temperature not exceeding 160° C. for effecting the complete fusion of the dispersed particles, following which the releasing material is stripped after the assembly has cooled. Alternatively, a method may be used wherein the foregoing aqueous dispersion, after having been applied, is dried at a temperature of 60–130° C., preferably 60–120° C., and particularly preferably 80–110° C., followed, if necessary, by a heat treatment step for a period not exceeding 10 minutes at a temperature not exceeding 160° C. to effect the complete fusion of the dispersed particles. The base cloth is then adhered by means of an adhesive and the releasing material is stripped. Thus, as hereinabove described, a sponge layer is formed on one side of the base cloth to provide a synthetic leather which has been imparted a surface treatment with or without the formation between the sponge layer and the surface treated layer of a skin layer. The adhesive can be applied to either the base cloth or the sponge layer side. After the cloth and sponge layer have been adhered by pressing together and drying, the assembly is heat treated if necessary. As the adhesive, useable are any adhesive in either an aqueous solution, aqueous dispersion or organic solvent solution form. Examples of the aqueous solution type of adhesive include such as an aqueous starch solution, aqueous polyvinyl alcohol solution and aqueous solution of water-soluble rubber. The aqueous dispersion type adhesives include, for example, any of the aqueous dispersions of high molecular weight substances according to the present invention which can be foamed by the addition of a hygroscopic porous material. On the other hand, the adhesives of the organic solvent solution type are exemplified by the polyacrylic ester resin solutions, polyurethane resin solutions and solutions of natural and synthetic rubber. Particularly desirable adhesives are the aqueous dispersion or organic solvent solutions of polyacrylic ester resins and polyurethane resins. The aqueous dispersions of the polyacrylic ester and polyurethane resins are those such as hereinbefore described. The polyacrylic ester solution is either a polymer solution obtained by polymerizing the hereinbefore mentioned acrylic ester monomers alone or in combination with other suitable monoethylenically unsaturated monomers in an organic solvent or a polymer solution obtained by dissolving in an organic solvent a polymer which has been obtained by the emulsion or suspension polymerization of monomeric components similar to those mentioned above. As the polyurethane resin solution, in addition to the polyurethane resin solution which is identical to that used for the formation of the skin layer, the thermosetting polyurethane resin can also be used. As the thermosetting polyurethane resin, useable are the compositions obtained by mixing together a polyhydroxy compound of a molecular weight of 300–5000, a reaction product obtained by reacting the foregoing polyhydroxy compound with a stoichiometrically insufficient amount of an organic diisocyanate, and a polyisocyanate compound having more than two isocyanate groups, as well as the compositions consisting of a polyhydroxy compound of a molecular weight of 300–5000 having more than two functional groups and a stoichiometric excess of an organic diisocyanate. The latter compositions can be hardened by the moisture contained in air. The foregoing polyhydroxy compounds are essentially the same as the polyhydroxy compounds that are used in the preparation of the hereinbefore described aqueous polyurethane dispersion, which is foamed by the invention process. Typical examples include the polyesters, polyethers and polyester ethers.

When the surface smoothness and/or surface strength of the sponge sheet of the laminated product consisting of a substructure and a sponge sheet material are unsatisfactory for the purpose intended, the surface property can be further improved by forming a continuous film layer on the sponge sheet as hereinbefore described. While the continuous film layer can be divided into the skin layer for improving the smoothness and/or strength of the surface of the sponge sheet and the surface treating agent layer for improving the surface strength and hand of the sponge layer, either one or both can be applied depending upon the improvement desired. Further, the resin used for the skin layer and that used for the surface treating agent layer need not necessarily be different but may be the same at times. As the skin layer, preferred is an aqueous dispersion or solution of polyurethane resin. As the solvents, useable are dimethylformamide, diethylformamide, dimethyl sulfoxide, diethyl sulfoxide, tetrahydrofuran, acetone, methyl ethyl ketone, methyl isobutyl ketone, cyclohexanone, and methylene dichloride. In addition, methyl acetate, ethyl acetate, butyl acetate, benzene, toluene and ethylene dichloride can be mixed with the foregoing solvents. Stabilizers for stabilizing against light and heat, fillers and colorants may also be used mixed in the skin layer.

The invention synthetic leather which has been stripped of a smooth releasing material has a smooth surface. Accordingly, if necessary, wrinkles are imparted thereto by crumpling it by hand or with the use of embossing rolls, whereupon it can be made to have the appearance like that of natural leather. Usually, when the releasing material, which has been stripped from the synthetic leather, is one which had been embossed in advance of the application thereto of the surface treating agent, further imparting of wrinkles to the resulting synthetic leather is not necessary.

The synthetic leather obtained by the invention process possesses especially superior properties as a material for upholstering vehicle interiors and seats of chairs as well as for binding of books. The following examples are given for further illustration of the present invention. Unless otherwise noted, the parts and percentages in the examples are on a weight basis.

Example 1

232 grams of tolylenediisocyanate were mixed in 1000 grams of hydroxyl-terminated polytetramethylene glycol of molecular weight 1500 and reacted for 3 hours at 80° C. to obtain a prepolymer having terminal isocyanate groups. To 100 parts of the so obtained prepolymer were admixed 150 parts of an aqueous solution containing 6 parts of polyoxyethylenenonylphenyl ether (number of moles of ethylene oxide added=40), followed by immediately emulsifying in a colloid mill. This was followed by the addition of 4 parts of 98% aqueous ethylenediamine solution to obtain an aqueous dispersion of solids content 42% of a polyurethane of an average particle diameter of 1 micron composed essentially of a linear polyurethane resin. The film obtained by drying this aqueous polyurethane dispersion and heat treating it for 3 minutes at 140° C. had a tensile strength of 320 kg./cm.$^2$, an elongation of 480% and a tenacity at 100% elongation of 23 kg./cm.$^3$.

0.5 part of citric acid was mixed in 100 parts of a methanol solution of methylated nylon 6 (resin concentration 20%). This mixture was then applied with a roll coater to silicone paper in an amount such that the film obtained upon-drying would be 0.01 mm. in thickness, dried for 2 minutes at 70° C., and thereafter heat treated for 3 minutes at 140° C. Atop this was applied an aqueous polyurethane dispersion thickened by the addition to 100 parts of the hereinbefore described aqueous polyurethane dispersion of 0.05 part of octyl alcohol (defoaming agent), 3 parts of a thickener consisting of an alkaline thickening type acrylic dispersion (an aqueous dispersion of a copolymer of 40 weight percent ethyl acrylate and 60 weight percent acrylic acid and of a resin content 25%) and 0.3 part of 25% ammonia water. The foregoing aqueous polyurethane dispersion was applied with a knife coater in an amount such that the film layer obtained upon drying would be 0.1 mm. in thickness and dried for 3 minutes at 95° C. Next, atop this was applied an aqueous bubble-containing polyurethane dispersion of an apparent specific gravity 0.48 obtained by adding to 100-parts of the hereinbefore described aqueous polyurethane dispersion 20 parts of silica gel powder of a particle size of 100–200 mesh, 3 parts of the hereinabove described thickener and 0.3 part of 25% ammonia water, the addition being made while agitating the dispersion at 1000 r.p.m. This latter dispersion was applied with a knife coater in an amount such that the film obtained upon drying would be 0.3 mm. in thickness. A 40 count cotton broad cloth was then superposed and adhered by pressing, after which the assembly was dried for 5 minutes at 110° C. and thereafter heat treated for 3 minutes at 130° C. After the assembly had cooled, the silicone paper was stripped. The foam layer of the resulting synthetic leather consisted of a polyurethane resin having uniformly foamed cells whose diameter was about 0.5 mm. This synthetic leather had a pleasing hand and thickish feel, thus possessing excellent properties as upholstery for seats.

On the other hand, when an aqueous polyurethane dispersion incorporated with air bubbles by agitation but without using the silica gel powder was applied instead of the aforesaid bubble-containing aqueous polyurethane dispersion, the size of the cells of the foam layer of the resulting synthetic leather was non-uniform, being of diameters ranging between 0.5 mm. and 1.5 mm. Further, there was the drawback that the polyurethane resin making up the foam layer tended to migrate to the outer surface during the drying step to collapse the resulting synthetic leather in the middle part of the foam layer.

Example 2

A resin solution consisting of 10 parts of poly(methyl methacrylate), 10 parts of a vinyl chloridevinyl acetate copolymer and 80 parts of methyl ethyl ketone was applied with a roll coater to silicone paper in an amount such that the resin film obtained upon drying would be 0.01 mm. in thickness and dried for 3 minutes at 70° C. Atop this was applied an aqueous polyurethane dispersion not containing any bubbles, which was obtained by mixing 0.05 part of the defoaming agent of Example 1, 20 parts of clay, 5 parts of the thickener of Example 1 and 0.5 part of 25% ammonia water in 100 parts of the aqueous polyurethane dispersion of resin concentration of 42% used in Example 1. The application of the dispersion was made with a knife coater in an amount such that the resin film obtained upon drying would be 0.2 mm. in thickness. After drying the dispersion-coated silicone paper for 5 minutes at 95° C., the bubble-containing aqueous polyurethane dispersion of Example 1 was applied with a knife coater in an amount such that the film obtained upon drying would be 0.3 mm. thickness. Atop this was superposed a cotton shirting which was adhered to the applied dispersion by pressing. The assembly was then dried for 3 minutes at 110° C. and thereafter heat treated for 3 minutes at 130° C. After the assembly had cooled, the silicone paper was stripped and by crumpling the resulting product by hand to impart wrinkles a synthetic leather having a natural leatherlike appearance and hand and suitable for upholstery of seats was obtained.

Example 3

Fifty grams of diphenylmethanediisocyanate were added to 2000 grams of polypropylene glycol of a molecular weight of 2000 and reacted for 2 hours at 70° C., following which 80 grams of toluene were added to obtain a solution of a prepolymer having terminal isocyanate groups. Five parts of polyoxyethylenenonylphenol ether (number of moles of ethylene oxide added=25) and 100 parts of an aqueous solution containing one part of sodium dodecylbenzenesulfonate were admixed with 100 parts of the foregoing prepolymer solution, after which the dispersion thereof was carried out in a colloid mill, followed by the addition of 10 grams of an aqueous solution containing 3.2 grams of hydrazine to obtain an aqueouh dispersion of polyurethane whose particle diameter was 0.5–1 micron. The concentration of this dispersion was 42%. The polyurethane resin film obtained by drying this dispersion and heat treating the resulting film for 3 minutes at 130° C. had a tensile strength of 240 kg./cm.$^2$, an elongation of 650% and a tenacity at 100% elongation of 20 kg./cm.$^2$. On the other hand, a polyurethane resin obtained from polybutyleneadipate and diphenyldiisocyanate, the dried film of which had a tensile strength of 620 kg./cm.$^2$, an elongation of 450% and a tenacity at 100% elongation of 120 kg./cm.$^2$ was dissolved in dimethylformamide to make a solution whose resin concentration was 25% and viscosity was 30,000 centipoises. This solution was applied with a knife coater to silicone paper in an amount such that the film obtained upon drying would be 0.15 mm. in thickness and dried for 5 minutes at 130° C. Atop this was applied a bubble-containing aqueous polyurethane dispersion of a specific gravity of 0.62, which was obtained by adding 15 parts of a 50–100 mesh silica gel powder, 5 parts of diatomaceous earth and 5 parts of toluene to 100 parts of the hereinbefore described aqueous polyurethane dispersion while agitating the latter at 1000 r.p.m. The application of this bubble-containing aqueous polyurethane dispersion was made with a knife coater in an amount such that the film layer obtained upon drying would be 0.3 mm. in thickness, followed by drying for 5 minutes at 110° C. Next, the same bubble-containing aqueous polyurethane dispersion was again applied in an amount such that the film layer obtained upon drying would be 0.3 mm. in thickness. Atop this was superposed a 40 count cotton broadcloth and adhered by pressing, followed by drying for 5 minutes at 110° C. and also heat treating the assembly for 3 minutes at 130° C. After the assembly had cooled, the silicone paper was stripped. This synthetic leather posessed excellent properties as upholstery of seats of vehicles.

Example 4

250 grams of diphenylmethanediisocyanate and 88 grams of toluene were added to 492 grams of poly (dimethyleneadipate) of a molecular weight of 984, and the reaction was carried out for 3 hours at 70° C. to obtain an 80% toluene solution of a prepolymer having terminal isocyanate groups. Five parts of polyoxyethylenenonylphenol ether (number of moles of ethylene oxide added= 40) and 10 parts of an aqueous solution containing 2 parts of potassium lauryl sulfate were mixed in 125 parts of the foregoing prepolymer solution and dispersed in a colloid mill, followed by the addition of 96 parts of an aqueous solution containing 32 parts of propylenediamine to obtain an aqueous dispersion of polyurethane of 37% concentration and particle diameter of 1 micron. The polyurethane resin film obtained by drying this aqueous polyurethane dispersion and heat treating the dried film for 3 minutes at 140° C. had a tensile strength of 372 kg./cm.$^2$, an elongation of 420% and a tenacity at 100% elongation of 35 kg./cm.$^2$.

The polyacrylic resin solution used in Example 2 was applied with a roll coater to silicone paper in an amount such that the film obtained upon drying would be 0.01 in thickness and dried for 3 minutes at 70° C. Atop this was applied an aqueous polyurethane dispersion not containing any bubbles, which was obtained by incorporating 7 parts of talc, 0.05 part of the defoaming agent of Example 1, 3 parts of the thickener of Example 1 and 0.3 part of 25% ammonia water in 100 parts of the hereinbefore described aqueous polyurethane dispersion. This application was made with a knife coater in an amount such that the film obtained upon drying would be 0.2 mm. in thickness and dried for 3 minutes at 110° C. Next, atop this was applied a bubble-containing aqueous polyurethane dispersion of an apparent specific gravity 0.65, which was obtained by adding 15 parts of silica gel powder, 5 parts of diatomaceous earth, 3 parts of the thickener of Example 1 and 0.3 part of 25% ammonia water to 100 parts of the hereinbefore described aqueous polyurethane solution while stirring same at a speed of 1000 r.p.m. This application was made with a knife coater in an amount such that the bubble-containing film layer upon drying would be 0.3 mm. in thickness and dried for 3 minutes at 110° C. Atop this was then further applied a thickened aqueous polyurethane dispersion, which was obtained by incorporating in 100 parts of the aqueous polyurethane dispersion of a concentration of 42% of Example 3, 5 parts of the thickener of Example 1 and 0.5 part of 25% ammonia water, this application being made with a knife coater in an amount of 100 grams per square meter. This was followed by adhering thereon a 40 count cotton broadcloth with pressure and drying for 3 minutes at 95° C. and thereafter heat treating the assembly for 3 minutes at 140° C. After the assembly had cooled, the silicone paper was stripped whereby a synthetic leather suitable for bookbinding purposes was obtained.

Example 5

The polyacrylic resin solution of Example 1 was applied to silicone paper with a roll coater in an amount such that the film obtained upon drying would be 0.01 mm. in thickness and dried for one minute at 70° C. followed by heat treating for 3 minutes at 140° C. Atop this was applied an aqueous polyurethane dispersion not containing any bubbles, which was obtained by mixing in 100 parts of the aqueous polyurethane dispersion of 30% concentration of Example 4, 15 parts of clay, 0.05 part of the defoaming agent of Example 1, 3 parts of the thickener of Example 1 and 0.3 part of 25% ammonia water. This application was made with a knife coater in an amount such that the film obtained upon drying would be 0.2 mm. in thickness and dried for 3 minutes at 95° C. Atop this was then applied a bubble-containing aqueous polyurethane dispersion of an apparent specific gravity of 0.63, which was obtained by mixing in the aqueous polyurethane dispersion of 42% concentration of Example 1, 10 parts of a silica gel powder of 100–200 mesh, 10 parts of diatomaceous earth, 3 parts of the thickener of Example 1 and 0.3 part of 25% ammonia water while agitating the dispersion at a speed of 1000 r.p.m. This was applied with a knife coater in an amount such that the cellular resin film layer obtained upon drying would be 0.3 mm. in thickness. Atop this was then superposed a 40 count cotton broadcloth and adhered thereto with pressure, after which the assembly was dried for 3 minutes at 110° C., followed by heat treating for 5 minutes at 130° C. After the assembly had cooled, the silicone paper was stripped. Next, the resulting product was crumpled by hand to impart a natural leatherlike appearance whereby a synthetic leather having a pleasing hand, which was excellent as seat material of vehicles was obtained.

Example 6

The bubble-containing aqueous polyurethane resin dispersion of Example 3 was applied to silicone paper with a knife coater in an amount such that the sponge sheet layer formed upon drying would be 0.4 mm. in thickness, after which a polyester/cotton mixed-spun (65/35 mixture) plain fabric was pressed thereon and dried for 15 minutes at 100° C. After the assembly had cooled, the silicone paper was stripped, and to the surface of sponge sheet layer was applied the unfoamed aqueous polyurethane resin dispersion of Example 3 to a thickness of 0.2 mm. and dried for 3 minutes at 90° C. After the assembly had cooled, a toluene solution of 20% concentration of a copolymer consisting of 80% by weight of methyl methacrylate and 20% by weight of butyl methylacrylate was applied by means of the gravure roll technique in such an amount that the resin content paper square meter was 7 grams, followed by drying for 3 minutes at 70° C. The so obtained laminated product consisting of a woven fabric layer, a sponge sheet layer and a surface treating agent was valuable as a synthetic leather, and was especially useful for bags, pouches, etc.

Example 7

The bubble-containing aqueous polyurethane resin dispersion of Example 3 was applied to silicone paper with a knife coater in an amount such that the sponge sheet layer formed upon drying would be 0.4 mm. in thickness and dried for 15 minutes at 100° C. After the sponge sheet layer had cooled, the aqueous polyurethane resin dispersion not containing any bubble of Example 3 was applied in an amount of 20 grams per square meter with a reverse roll coater, followed by pressing thereon of an acetate tricot and drying for 3 minutes at 90° C. After the assembly had cooled, the silicone paper was stripped, and the same aqueous polyurethane resin dispersion not containing any bubbles was applied with a knife coater in an amount such that the resin layer formed upon drying would be 0.2 mm. in thickness and dried for 10 minutes at 100° C. To this was further applied a 10% ethylene dichloride solution of poly(gamma-methylglutamate) so that the resin coating applied would amount to 8 grams per square meter, using a gravure roll, followed by drying for 3 minutes at 80° C.

Example 8

A 20% ethylene dichloride solution of poly(gamma-methylglutamate) was applied with a reverse roll coater to a silicone paper whose surface was imparted wrinkles simulating those of natural leather, the application being made in such an amount that the layer formed upon drying would be 0.02 mm. in thickness, followed by drying for 3 minutes at 80° C. After cooling, the thickened aqueous polyurethane dispersion of Example 1 was applied with a knife coater to a thickness of 0.2 mm. and dried for 5 minutes at 100° C. Atop this was then applied the bubble-containing aqueous polyurethane resin dispersion of Example 4 with a knife coater in an amount such that the sponge sheet obtained upon drying would be 0.4 mm. in thickness, folowed by drying for 15 minutes at 100° C. After the assembly had cooled, the aqueous polyurethane resin dispersion not containing any bubbles of Example 3 was applied in an amount of 50 grams per square meter, followed immediately by pressing an acetate tricot thereon and drying for 3 minutes at 80° C. After the assembly had cooled, the silicone paper was stripped, whereupon a synthetic leather whose surface was wrinkled was obtained. This product had excellent properties as a material for garments.

Example 9

While agitating 100 parts of the aqueous polyurethane dispersion of Example 1 at a speed of 2000 r.p.m. with an agitator equipped with a propeller type agitating vane, 15 parts of a vinyl chloride-vinyl acetate copolymer powder (not larger than 100 mesh) were added. The volume increased to 1.83 times the original volume. When this bubble-containing aqueous dispersion was used instead of the bubble-containing aqueous dispersion of Example 1 and the experiment was conducted as in Example 1, a synthetic leather having excellent properties was likewise obtained.

EXAMPLE 10

A releasing paper embossed with leatherlike designs was coated with the aqueous polyurethane solution of Example 3 in an amount such that the film resulting upon drying would be 0.06 mm. in thickness and dried for 3 minutes at 80° C. Atop this was applied the thickened aqueous polyurethane dispersion of Example 1 with a knife coater in an amount such that the film obtained upon drying would be 0.1 mm. in thickness and dried for 3 minutes at 95° C. Atop this was applied the bubble-containing aqueous polyurethane dispersion of Example 3 with a knife coater in an amount such that the sponge sheet layer obtained upon drying would be 0.3 mm. in thickness, followed by superposing thereon of a 40 count cotton broadcloth and adhering same thereto with pressure. The assembly was then dried for 5 minutes at 100° C. and heat treated for 3 minutes at 140° C. Upon cooling of the assembly, the releasing paper was stripped. The surface of this synthetic leather had the designs of the releasing paper embossed inversely thereon. Its appearance and hand were superior it possessed excellent properties as upholstery for seats of vehicles.

We claim:
1. A process for manufacturing a synthetic leather which comprises (1) applying a solution of a surface-treating agent selected from the group consisting of polyamides, polyurethanes and polyacrylic resins to the surface of a releasing material in an amount such that the thickness of the film obtained upon drying said solution is 0.002–0.2 mm.; (2) drying said solution to obtain said film; (3) thereafter applying to said film an aqueous dispersion blend containing minute gas bubbles and of an apparent specific gravity not greater than 0.7, said dispersion blend having been obtained by mixing in an aqueous dispersion of a polyurethane resin obtained from at least one hydroxyl-terminated compound having a molecular weight of 600–4000 selected from the group consisting of polyethers, polyesters and polyetheresters, a diisocyanate and a chain extender of a resin concentration of at least 25 percent by weight and dispersion particle diameter of not exceeding 5 microns, the dried film of which has a tensile strength of at least 100 kilograms per square centimeter, an elongation of at least 200 percent and a tenacity at 100 percent elongation in the range of 5 to 50 kilograms per square centimeter, 10–100% by weight, based on the weight of said polyurethane resin in said aqueous dispersion, of a hygroscopic porous material selected from the group consisting of silica gel, alumina gel and zeolite smaller than 30 mesh, the application of said dispersion blend being an an amount such that the resin film layer obtained upon drying said dispersion blend is 0.2–1 mm. in thickness; (4) superposing and adhering a base material selected from the group consisting of woven fabrics, non-woven fabrics and knitted fabrics on said dispersion blend-coated surface; and (5) thereafter stripping said releasing material from the final assembly.

2. A process for manufacturing a synthetic leather which comprises (1) applying a solution of a surface treating agent selected from the group consisting of polyamides, polyurethanes and polyacrylic resins to the surface of a releasing material in an amount such that the thickness of the film obtained upon drying said solution is 0.002–0.2 mm.; (2) drying said solution to obtain said film; (3) thereafter applying to said film an aqueous dispersion of a polyurethane resin obtained from at least one hydroxyl-terminated compound having a molecular weight of 600–4000 selected from the group consisting of polyethers, polyesters and polyetheresters, a diisocyanate and a chain extender of a resin concentration of at least 25 percent by weight and dispersion particle diameter of not exceeding 5 microns, the dried film of which has a tensile strength of at least 100 kilograms per square centimeter, an elongation of at least 200 percent and a tenacity at 100 percent elongation in the range of 5 to 50 kilograms per square centimeter, the application of said aqueous dispersion being made in an amount such that the film thereof obtained upon drying said dispersion does not exceed 0.5 mm. in thickness; (4) further applying an aqueous dispersion blend containing minute gas bubbles and of an apparent specific gravity of not greater than 0.7, said dispersion blend having been obtained by mixing in an aqueous polyurethane dispersion, as hereinabove defined, 10–100 percent by weight, based on the weight of said polyurethane resin contained therein, of a hygroscopic porous material selected from the group consisting of silica gel, alumina gel and zeolite smaller than 30 mesh, said dispersion blend being applied in an amount such that the thickness of the polyurethane film layer obtained upon drying is 0.2–1 mm.; (5) superposing and adhering a base material selected from the group consisting of woven fabrics, non-woven fabrics and knitted fabrics on said dispersion blend-coated surface; and (6) thereafter stripping said releasing material from the final assembly.

3. A process for manufacturing a synthetic leather which comprises (1) applying to the surface of a releasing material an aqueous dispersion of a polyurethane resin obtained from at least one hydroxyl-terminated compound having a molecular weight of 600–4000 selected from the group consisting of polyethers, polyesters and polyetheresters, a diisocyanate and a chain extender of a resin concentration of at least 25 percent by weight and of dispersion particle diameter not exceeding 5 microns, the dried film of which has a tensile strength of at least 100 kilograms per square centimeter, an elongation of at least 200 percent and a tenacity of 100 percent elongation in the range of 5 to 50 kilograms per square centimeter, the application of said dispersion being made in an amount such that that the thickness of the film obtained upon drying does not exceed 0.5 mm.; (2) drying said applied dispersion; (3) thereafter applying an aqueous dispersion blend containing minute gas bubbles and of an apparent specific gravity not greater than 0.7, said dispersion blend having been obtained by mixing in an aqueous polyurethane dispersion, as hereinabove defined, 10–100 percent by weight, based on the weight of the polyurethane resin contained therein, of a hygroscopic porous material selected from the group consisting of silica gel, alumina gel and zeolite smaller than 30 mesh, said dispersion blend being applied in an amount such that the polyurethane film layer obtained upon drying said dispersion blend is 0.2–1 mm. in thickness; (4) superposing and adhering a base material selected from the group consisting of woven fabrics, non-woven fabrics and knitted fabrics on said dispersion blend-coated surface; (5) stripping said releasing material from the final assembly; (6) thereafter applying a solution of a surface treating agent selected from the group consisting of polyamides, polyurethanes and polyacrylic resins in an amount such that the film obtained upon drying said solution is 0.002–0.2 mm. in thickness; and (7) drying said solution.

4. A process for manufacturing a synthetic leather which comprises (1) applying to the surface of a releasing material an aqueous dispersion blend containing minute gas bubbles and of an apparent specific gravity not greater than 0.7, said dispersion blend being obtained by mixing in an aqueous dispersion of a polyurethane resin obtained from at least one hydroxyl-terminated compound having a molecular weight of 600–4000 selected from the group consisting of polyethers, polyesters and polyetheresters, a diisocyanate and a chain extender of a resin concentration of at least 25 percent by weight and dispersion particle diameter not exceeding 5 microns, the dried film of which has a tensile strength of at least 100 kilograms per square centimeter, an elongation of at least 200 percent and a tenacity at 100 percent elongation in the range of 5 to 50 kilograms per square centimeter, 10–100 percent by weight, based on the weight of said polyurethane resin contained in said aqueous dispersion, of a hygroscopic porous material selected from the group consisting of silica gel, alumina gel and zeolite smaller than 30 mesh, said dispersion blend be applied in an amount such that the polyurethane film obtained upon drying is 0.2–1 mm. in thickness; (2) superposing and adhering a base material selected from the group consisting of woven fabrics, non-woven fabrics and knitted fabrics on the dispersion blend-coated surface; (3) stripping said releasing material from the assembly; (4) thereafter on the releasing material stripped surface of the resulting sheet applying a solution of a surface treating agent selected from the group consisting of polyamides, polyurethanes and polyacrylic resins in an amount such that the thickness of the film upon drying said solution is 0.002–0.2 mm.; and (5) drying said solution.

5. The process of claim 1 wherein said releasing material is an embossed releasing material.

6. The process of claim 1 further including (6) imparting wrinkles by hand to the synthetic leather.

7. The process of claim 2 further including (7) imparting wrinkles by hand to the synthetic leather.

8. The process of claim 3 further including (8) imparting wrinkles by hand to the synthetic leather.

9. The process of claim 4 further including (6) imparting wrinkles by hand to the synthetic leather.

10. The process of claim 1 further including (6) imparting wrinkles to the synthetic leather by pressing the said synthetic leather with embossing rolls.

11. The process of claim 2 further including (7) imparting wrinkles to the synthetic leather by pressing the said synthetic leather with embossing rolls.

12. The process of claim 3 further including (8) imparting wrinkles to the synthetic leather by pressing the said synthetic leather with embossing rolls.

13. The process of claim 4 further including (6) imparting wrinkles to the synthetic leather by pressing the said synthetic leather with embossing rolls.

References Cited
UNITED STATES PATENTS

| | | | |
|---|---|---|---|
| 3,100,721 | 8/1963 | Holden | 264—41 UX |
| 3,190,765 | 6/1965 | Yuan | 264—41 UX |
| 3,418,168 | 12/1968 | Wentworth | 264—41 UX |
| 3,450,650 | 6/1969 | Murata | 264—41 UX |
| 3,266,966 | 8/1966 | Patchell | 264—54 X |
| 3,415,913 | 12/1968 | Lux | 264—321 X |
| 3,369,925 | 2/1968 | Matsushita et al. | 264—41 UX |
| 3,539,388 | 10/1970 | Shu-Tung Tu | 264—41 X |

PHILIP E. ANDERSON, Primary Examiner

U.S. Cl. X.R.

161—159; DIG. 2; 260—2.5 AK, 2.5 AY, 37 R; 264—45, 321, DIG. 62, DIG. 66, DIG. 77